2,906,595
Patented Sept. 29, 1959

2,906,595
PROCESS WATER TREATMENT

Emil Jerry Pelcak, Ramsey, N.J., and Albert C. Dornbush, Pearl River, N.Y., assignors to American Cyanamid Company, New York, N.Y., a corporation of Maine No Drawing. Application April 29, 1957
Serial No. 655,487

6 Claims. (Cl. 21—2.7)

This invention relates to an improved process for utilization of water supplies previously considered unsatisfactory for many tpes of industrial processing. As such it is concerned particularly with treating water for industrial use in mining, mineral-dressing, secondary stage oil recovery and the like when the available water produces excessive corrosion, blocking off low passages and other similar difficulties.

In general, the present invention contemplates overcoming these difficulties by making such water bacteriostatic to sulfur-reducing bacteria. Surprisingly, it has been found this can be accomplished by dissolving therein small amounts of long-chain aliphatic guanidines and/or their salts.

In accordance with the present invention, it has been found that many of the practical difficulties encountered in using and/or reusing process water are the result, directly or indirectly of bacterial activity therein. Among others, in particular, it would seem that some of the most objectionable microorganisms comprise a group of bacteria which are capable of reducing the sulfate radical to sulfide.

In general, these sulfate-reducing microorganisms are found to belong to the genus Desulfovibrio. Although several species such as *desulphuricans, aestuarii* and *rubentschickii*, may be encountered; *Desulfovibrio desulphuricans* is typical in its objectionable properties and requirements for control and will be so taken in this discussion. Conditions under which it may be inhibited or destroyed will control other species of the same genus and the like.

"Desulfovibrio" organisms grow readily under a wide range of environmental conditions. For example: since they are able to flourish in salt concentration ranging from 0 to 30% they are found not only in fresh waters but also in brackish water, salt pools and sea water, environments which interfere with many ordinary bacteriacides. Moreover, they readily develop increasing resistance to chlorine and the like.

An industrially-feasible, economical method for eliminating or inhibiting such organisms has been sought for some time. Despite the industrial importance of the problem, a generally satisfactory solution previously has not been found.

It is therefore the principal object of the present invention to supply a method of minimizing the adverse effects which result from the presence in the water of these sulfur-reducing microorganisms.

Surprisingly, the solution to the problem, once found, is quite simple. It consists broadly in adding to the process water, an effective amount of certain substituted guanidines and/or their salts. In general, these compounds may be represented by the type formula

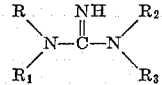   I wherein R is a long chain aliphatic hydrocarbon radical of from about 8 to about 16 carbon atoms and each of $R_1$, $R_2$ and $R_3$ represent hydrogen or R. The compounds may be used per se or as a salt thereof of the type

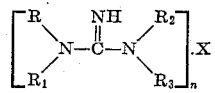   II wherein X represents an acidic salt-forming group and $n$ is a small whole number, usually one, two or three.

Since the oil-producing industry presents most of the typical problems, it will be taken as illustrative in discussing the invention. Various measures are resorted to in order to recover petroleum from the "fields" after the initial positive gas pressure is dissipated. For example, a negative pressure is applied and as much oil as possible is pumped from the wells. When further recovery by this means is no longer economical, it is a common practice to drill additional holes at some distance from the primary wells and through these force water under pressure to effect a secondary recovery of the oil from the strata. As there usually is a paucity of fresh water in the "oil-rich" areas, sea water, brines and by-product water are frequently used and reused to recover the oil. Such recycling insures the presence of the objectionable sulfate-reducing microorganisms.

The organisms are particularly troublesome in the petroleum industry, however, for in addition to their ability to exist in solutions containing assimilable sources of carbon and nitrogen, they are able to utilize trace amounts of sulfate ion. Desulfovibrios have been reported to make use of the small amount of energy released by the reaction of iron with water yielding hydrogen. In some complex manner such organisms use this hydrogen to reduce the sulfate present in solution to sulfide.

One direct result is an increased corrosion of iron and steel equipment. In addition to corroding the pipes carrying brine and traces of oil, their growth causes precipitation of resultant sulfide in the form of insoluble heavy metal sulfides. This has become a major problem during the secondary stages of oil recovery by causing blockage of water-permeable pores at the face of the injection site with a tenacious mixture of the insoluble heavy metal sulfides and of the organisms themselves. Because treatments to remove such plugs are difficult and only partially effective, the water permeability of wells so-treated and hence their productivity progressively diminishes.

In accordance with the present invention, treating the "water" used in this secondary recovery with an appropriate aliphatic guanidine not only will help reduce corrosion of the pipes but avoid such blockage of water percolation. The same utility of such treatment is found in various mineral leaching schedules. Suitable guanidines for the present invention have been noted above in connection with Formulae I and II. Of the compounds within this group, probably the most economical are mono-substituted aliphatic guanidines. Although di-substituted guanidines are also effective, they are less readily available. Moreover, since substitution of an additional identical alkyl radical does not correspondingly increase the activity in general they are less economical. In general, then, at least two, and usually all three, of $R_1$, $R_2$ and $R_3$ in Formulae I and II will be hydrogen.

As the aliphatic substituent, long-chain alkyl radicals are preferred. Below about ten carbon atoms, as the size of the alkyl group decreases, bactericidal activity against Desulfovibrio microorganisms progressively decreases. When the alkyl substituent contains fewer than about eight carbon atoms, uneconomically high dosages are required. As the number of carbon atoms is increased, bacteriostatic activity increases, passing an optimum between about ten and fourteen carbon atoms and then falling off progressively so that alkyls of about eighteen carbons constitute about the maximum desirable size. Therefore, the useful range comprises alkyl radicals of from about eight to about eighteen carbon atoms.

Of the $C_8$ to $C_{18}$-alkyl guanidines assayed, activity against sulfate-reducing organisms appears to be a function of chain length rather than molecular weight. For example, n-octyl guanidine is more effective against Desulfovibrios than compounds containing secondary or tertiary octyl radicals. Aliphatic chains containing double bonds are also generally less active than those fully saturated. However, it is an advantage of the invention that a single alkyl guanidine is not required. Mixtures of alkyl or alkyl and alkenyl guanidines may be used. Therefore, many commercial grades of mixed "alkyls" can be used in preparing suitably substituted guanidines. In such cases, however, mixtures averaging between $C_8$ and $C_{16}$ and preferably $C_{10}$–$C_{14}$ should be used when possible. Moreover, mixtures containing minimized amounts of branched or unsaturated chains should be selected.

In general, alkyl guanidines are less water-soluble than their salts and the latter will ordinarily be utilized. In many cases, however, the water to be treated will be sufficiently acidic, usually with sulfuric acid, that if a free base is added the sulfate salt forms. Use of the sulfate salt is not necessarily a limitation and salts of any of the common acids may be used. These include, for example, such additional acids as the following:

| | |
|---|---|
| Acetic | Maleic |
| Propionic | Pthalic |
| Butyric | Benzoic |
| Valeric | Naphthoic |
| Caproic | Carbonic |
| Caprylic | Bicarbonic |
| Lauric | Boric |
| Capric | Hydrochloric |
| Stearic | Nitric |
| Lactic | Phosphoric |
| Malic | |

Since the acetate salts are simple, effective, economical and easily prepared, they are taken as illustrative but the invention is not limited thereto. When a dibasic acid is used $n$ in Formula II above may be either one or two.

As to the amount required to effectively inhibit Desulfovibrio organisms, different strains have been found to vary considerably in virility. The extent of contamination is also a factor. In some cases as little as about 0.25 part per million (p.p.m.) are effective. In others as much as 50 p.p.m. may be required.

If so desired, bactericides of this invention may be added directly to the water in any suitable tank. However, even though the maximum concentrations used are small, the volumes are large and uniform mixing is highly desirable. Direct addition, though simple, is not usually wholly satisfactory. Accordingly, the most useful mode of addition is to prepare a relatively smaller but more concentrated solution than the final dilution desired. This solution can then be metered by a proportioning pump or its equivalent into a suitably agitated tank or a flow of water as the latter is being pumped to the point of use. Normal turbulent flow in the conduit produces adequate mixing. In this way, accurate dosages can be supplied and uniform dilutions are obtained.

Where the treated water must be exposed to sunlight for extended periods, addition of a strongly phytotoxic agent is often desirable. The preferred composition will comprise an admixture of about one part of the alkyl guanidine or salt and from about 0.01 to about 0.10 part of 3-amino-1,2,4-triazole.

The invention will be further illustrated in conjunction with the following examples, which are intended as illustrative only and not by way of limitation.

Some of the alkyl guanidines and salts used in the present invention previously have not been commercially available. They may be prepared by any suitable method. That which is preferred, where complete purity is not an essential, is to dissolve an amine containing the desired alkyl group, or a mixture of such amines, in an alcoholic solvent; add thereto an equivalent of the acid of which the salt is desired; heat the mixture, usually under reflux; add cyanamide; cool; dilute; and collect resultant precipitated salt. This is shown, by way of illustration in the following example.

EXAMPLE I

Ninety-five parts of a commercial alkylamine (2% $C_{10}$, 95% $C_{12}$ and 3% $C_{14}$) is taken up in 110 parts of isopropanol, about 30 parts of propionic acid is added thereto (pH 9.9), the mixture is brought to reflux, over one-half hour is added about 107 parts of 30% aqueous cyanamide (pH about 9.3) and reflux is maintained until reaction substantially ceases, after which solution is cooled, diluted with about 200 parts of methyl ethyl ketone and about 93 parts product (M.P. 120–128° C.) filtered from resultant slurry. About 75 parts of product (M.P. 143°–145° C.) is obtained by recrystallizing from water. Calculated for $C_{16}H_{35}N_3O_2$ the product analysis is:

| | Percent C | Percent H |
|---|---|---|
| Calculated | 63.78 | 11.63 |
| Found | 63.74 | 11.65 |
| | 63.84 | 11.65 |

Other illustrative alkyl guanidine salts in accordance with Formulae I and II above include the following

| | M.P. (° C.) |
|---|---|
| Octyl guanidine acetate | 125–126 |
| Decyl guanidine acetate | 110–116 |
| Dodecyl guanidine acetate | 135–136 |
| Hexadecyl guanidine acetate | 135–136 |
| Octadecyl guanidine acetate | 125–127 |
| Mixed alkyl guanidine acetate (2%—$C_{14}$, 24%—$C_{16}$, 79%—$C_{18}$) | 110–115 |
| Dodecyl guanidine sulfate | [1] 215–218 |
| Dodecyl guanidine borate | [1] 240–300 |
| Dodecyl guanidine phosphate | 133–135 |
| Dodecyl guanidine nitrate | 107–108 |
| Dodecyl guanidine hydrochloride | 53 |
| Dodecyl guanidine formate | 76–77 |
| Dodecyl guanidine butyrate | 168–171 |
| Dodecyl guanidine laurate | 140–144 |
| Dodecyl guanidine lactate | 89–91 |
| Dodecyl guanidine maleate | (amorphous) |
| bis-Dodecyl guanidine oxalate | 190–192 |
| Dodecyl guanidine succinate | 128–130 |
| bis-Dodecyl guanidine succinate | 116–117 |
| Dodecyl guanidine maleate | 87–89 |
| bis-Dodecyl guanidine maleate | 103–105 |
| bis-Dodecyl guanidine citrate | 104–105 |
| Dodecyl guanidine benzoate | 66–67.5 |

[1] With decomp.

In order to illustrate the effectiveness of treatment according to the present invention, the following examples are given as illustrative.

EXAMPLE II

Five actively growing cultures of *Desulfovibrio desulfuricans* were obtained from different sources. The minimum concentration (p.p.m.) of dodecylguanidine acetate required to inhibit growth of the cultures for different periods of time was measured. Illustrative results are shown below in Table I.

*Table I.—Concentration of dodecylguanidine acetate required to inhibit growth—parts per million*

| Culture No. | Number of days incubation | | | | | |
|---|---|---|---|---|---|---|
| | 1 | 2 | 3 | 5 | 15 | 29 |
| 1 | 1.56 | 1.56 | 3.12 | 3.12 | 3.12 | 3.12 |
| 2 | 1.56 | 1.56 | 1.56 | 1.56 | 1.56 | 1.56 |
| 3 | 1.56 | 1.56 | 3.12 | 3.12 | 3.12 | 3.12 |
| 4 | 1.56 | 1.56 | 1.56 | 1.56 | 1.56 | 1.56 |
| 5 | 0.39 | 0.39 | 0.39 | 0.78 | 0.78 | 0.78 |

EXAMPLE III

The minimum concentration (parts per million) required to destroy actively-growing cultures of *Desulfovibrio desulfuricans* after different contact times was determined for cultures one and five of Example 2. Illustrative results are shown in Table II.

*Table II*

| Exposure Time (Hours) | Culture No. | No. of Days' Incubation | | | | | | |
|---|---|---|---|---|---|---|---|---|
| | | 2 | 3 | 4 | 5 | 6 | 9 | 16 |
| 0.5 | 1 | .5 | 1 | 1 | 1 | 1 | 1 | 1 |
| | 5 | .5 | .5 | 1 | 1 | 1 | 1 | 1 |
| 1.0 | 1 | .5 | 1 | 1 | 1 | 1 | 1 | 1 |
| | 5 | 1 | .5 | 1 | 1 | 1 | 1 | 1 |
| 2.0 | 1 | .5 | .5 | 1 | 1 | 1 | 1 | 1 |
| | 5 | .5 | .5 | .5 | .5 | 1 | 1 | 1 |
| 4.0 | 1 | .5 | .5 | .5 | 1 | 1 | 1 | 1 |
| | 5 | .25 | .5 | .5 | .5 | 1 | 1 | 1 |
| 24 [1] | 1 | .5 | .5 | .5 | .5 | .5 | .5 | .5 |
| | 5 | ≦.25 | ≦.25 | ≦.25 | ≦.25 | ≦.25 | ≦.25 | ≦.25 |

[1] All 24 hrs. readings 1 day less than column heading.

We claim:

1. A method of treating industrial saline process water to inhibit the growth of sulfate-reducing bacteria and corrosion induced by such bacteria which comprises: providing in said process water a member selected from the group consisting of compounds and mixtures thereof represented by the formulae and

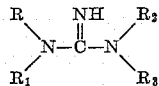

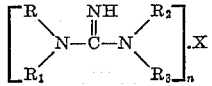

wherein R represents an aliphatic hydrocarbon radical of from about 8 to about 18 carbon atoms, $R_1$, $R_2$ and $R_3$ represent a member of the group consisting of R and hydrogen, X represents a salt forming acidic group and $n$ represents a small whole number.

2. A process according to claim 1 in which said member is dodecylguanidine acetate.

3. A process according to claim 1 in which said member is provided in an amount of about 0.25 to about 50 parts per million parts of process water.

4. A method according to claim 1 in which said member is dodecyl guanidine hydrochloride.

5. In forcing oil from an underground well by "flooding" the well with saline process water, the improved method of inhibiting in said water the growth of sulfate-reducing bacteria and corrosion induced by such bacteria which comprises: preparing a concentrated aqueous solution comprising a member selected from the group consisting of compounds and mixtures thereof represented by the formulae

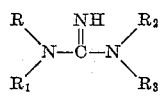

and

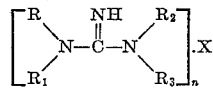

wherein R represents an aliphatic hydrocarbon radical of from about 8 to about 18 carbon atoms, $R_1$ and $R_2$ and $R_3$ represent a member of the group consisting of R and hydrogen, X represents a salt forming acidic group and $n$ represents a small whole number; and adding to and thoroughly mixing with said process water an amount of said concentrated solution, whereby a uniformly dilute solution is obtained in which said member is present in an amount of at least 0.25 part per million parts of process water.

6. A process according to claim 5 in which said member is dodecylguanidine acetate.

References Cited in the file of this patent

UNITED STATES PATENTS

| 2,213,474 | Puetzer | Sept. 3, 1940 |
| 2,598,213 | Blair | May 27, 1952 |
| 2,670,282 | Allen | Feb. 23, 1954 |